No. 821,428. PATENTED MAY 22, 1906.
J. H. NEAL.
COMPUTING ATTACHMENT FOR TYPE WRITING MACHINES.
APPLICATION FILED JULY 2, 1903.

Witnesses.
Inventor.
James H. Neal
by Jas. H. Churchill
atty.

No. 821,428. PATENTED MAY 22, 1906.
J. H. NEAL.
COMPUTING ATTACHMENT FOR TYPE WRITING MACHINES.
APPLICATION FILED JULY 2, 1903.

Witnesses.
Inventor:
James H. Neal
by Jas. H. Churchill
Atty.

No. 821,428. PATENTED MAY 22, 1906.
J. H. NEAL.
COMPUTING ATTACHMENT FOR TYPE WRITING MACHINES.
APPLICATION FILED JULY 2, 1903.

Witnesses.
Inventor.

No. 821,428. PATENTED MAY 22, 1906.
J. H. NEAL.
COMPUTING ATTACHMENT FOR TYPE WRITING MACHINES.
APPLICATION FILED JULY 2, 1903.

Witnesses
C. H. Garnett
J. Murphy

Inventor
James H. Neal
by Jas. H. Churchill
Atty.

UNITED STATES PATENT OFFICE.

JAMES HENRY NEAL, OF BOSTON, MASSACHUSETTS, ASSIGNOR OF ONE-HALF TO HENRY L. WILSON, OF BROOKLINE, MASSACHUSETTS.

COMPUTING ATTACHMENT FOR TYPE-WRITING MACHINES.

No. 821,428.

Specification of Letters Patent.

Patented May 22, 1906.

Application filed July 2, 1903. Serial No. 164,009.

*To all whom it may concern:*

Be it known that I, JAMES HENRY NEAL, a citizen of the United States, residing in Boston, in the county of Suffolk and State of Massachusetts, have invented an Improvement in Computing Attachments for Type-Writing Machines, of which the following description, in connection with the accompanying drawings, is a specification, like characters on the drawings representing like parts.

This invention relates to a computing attachment for type-writing machines and is an improvement upon that shown and described in United States Patent No. 689,983, granted to me December 31, 1901.

The present invention has for one of its objects to prevent movement of the parts of the computing device by momentum, thereby avoiding inaccuracies from this source.

The invention further has for its object to provide for bodily moving the totalizer in two directions substantially at right angles to each other for a purpose as will be described.

A further object is to increase the efficiency of devices of this class.

Other features of this invention will be pointed out in the claims at the end of the specification.

Fig. 3, a detail in front elevation and on an enlarged scale to be referred to; Figs. 4 and 5, details to be referred to, Fig. 5 being an elevation of Fig. 4 looking toward the right; Fig. 6, a vertical section, on an enlarged scale, taken on the line 6 6, Fig. 1; Fig. 6ª, a view like Fig. 6 with parts omitted; Figs. 7 and 8, details of the releasing device to be referred to; Fig. 9, a view like Fig. 6 with the parts in the position they occupy when a numeral-key is depressed; Fig. 9ª, a detail to be referred to; Fig. 10, a sectional detail of the totalizer, showing the carrying-forward pawl withdrawn; Figs. 11, 12, and 13, details of the push-pawl to be referred to; Fig. 14, a section on the line 14 14, Fig. 3, looking toward the right; Fig. 15, a section on the line 15 15, Fig. 3, looking toward the left; Figs. 16 and 17, details of parts of the totalizer to be referred to, Fig. 17 being a front elevation of Fig. 16; Fig. 18, a detail in front elevation of the lower part of the totalizer with parts broken away to show the brake mechanism for the carrying-forward pawls; Fig. 19, a detail in plan to be referred to, and Fig. 20 an elevation of the parts shown in Fig. 19.

The type-writing machine which I have chosen to illustrate as provided with a computing attachment embodying my invention is of the well-known "Remington" type and need not be specifically described.

Figures 6, 7, 8:
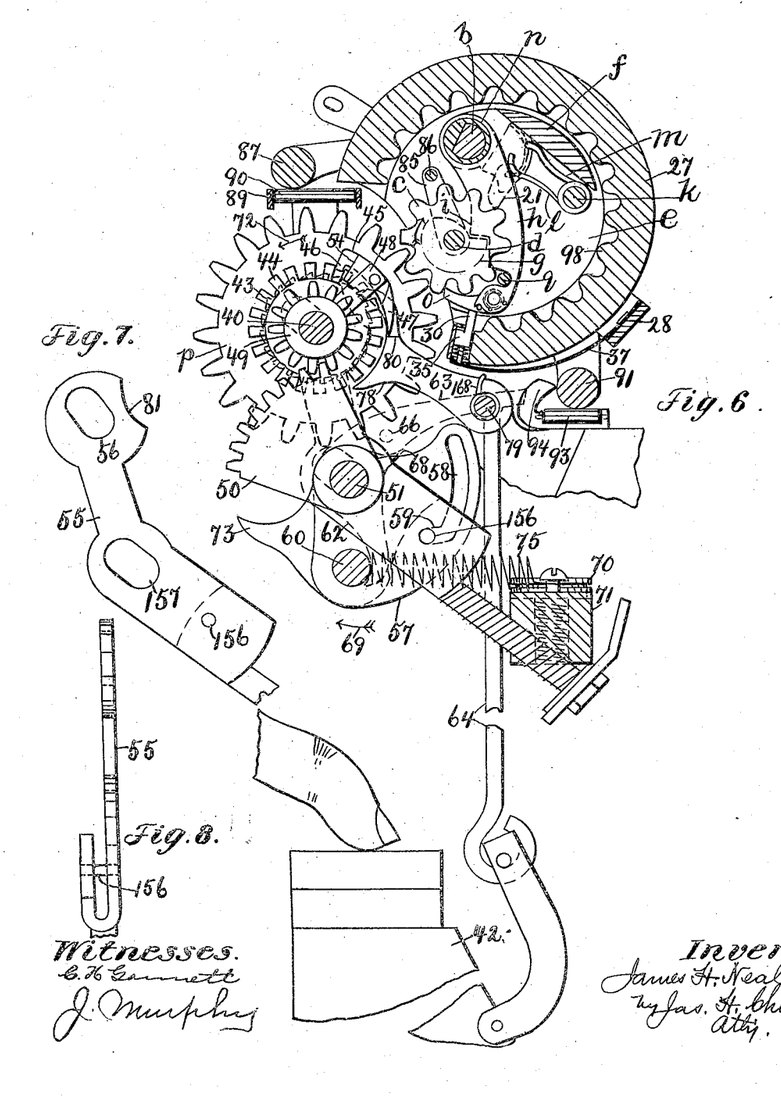
Figure 6A:
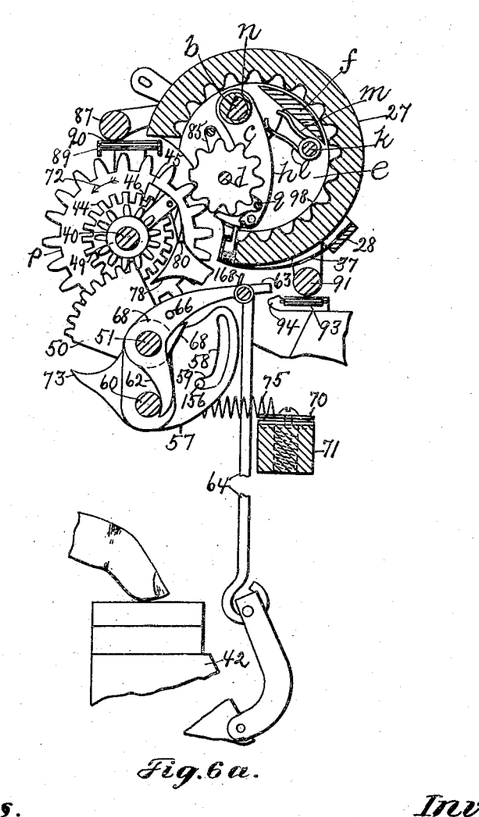

In the machine herein shown, $a$ represents the paper-carriage, which has detachably secured to it, as will be described, a supporting-rod $b$, upon which is mounted a totalizer, which in accordance with this present invention comprises a series of numeral toothed wheels $c$, loose on a shaft $d$, (see Fig. 6,) having bearings in segmental end disks $e$, connected by a segmental cross-bar $f$. Each numeral-wheel $c$ has secured to one face a cam $g$, with which coöperates a lever $h$, which may be designated the "carrying-forward lever" and which is provided with a finger or projection $i$, which is engaged by the cam $g$ to move the lever backward against the action of a spring, shown as a coiled spring mounted on a rod $k$, supported by the end disks $e$ and having two arms $l$ $m$, one of which, as $l$, engages the back of the lever $h$, and the other, as $m$, engages the cross-bar $f$. The levers $h$ are pivotally mounted upon a sleeve $n$, supported by the end disks $e$ and through which the rod $b$ is extended. The lever $h$ has pivoted to its lower end a pawl $o$, which is located in line with the numeral-wheel $c$ next adjacent to the numeral-wheel with whose cam $g$ the finger $i$ engages, so that when the lever $h$ is permitted to move forward the pawl $o$ will move the next adjacent numeral-wheel the distance of one tooth. This action takes place when one toothed wheel has been moved a complete circle by a master-wheel $p$, as will be described, and the cam $g$ on said numeral-wheel has been moved into substantially the position shown in Fig. 6, in which position the reduced portion of the cam is in position to permit the finger $i$ on the lever $h$ to move forward.

The forward movement of the levers $h$ is limited by a stop rod or bar $q$, supported by the end disk $e$. The numeral-wheels $c$ are held from rotating in a reverse or backward direction by pawls 21, (see Figs. 6, 16, and 17,) which are pivoted between slotted arms 22, projecting from the cross-bar *f* and held in engagement with said wheels by springs 23. The arms 22 serve as spacing devices for the carrying-forward levers *h*, which are mounted on the sleeve *n* between said arms, the said sleeve being extended through an opening 24 in each of said arms.

The end disks *e* and connecting cross-bar *f* constitute a frame for supporting the essential parts of the totalizer, and the said frame has secured or otherwise detachably secured to its disks *e* like disks 26, between which is located a segmental drum or shell 27, which is free to revolve on reduced portions of the disk 26, which latter may be connected together by a yoke or bar 28.

Provision is made in the present instance to prevent inaccuracies in the operation of the totalizer by reason of the numeral-wheel, which is carried forward or actuated by the pawl *o*, from being moved by momentum more than the proper distance, and to this end I have provided a brake mechanism which coöperates with the carrying-forward pawls, whereby the forward movement of the pawls is retarded, so as to prevent the numeral-wheels which are actuated by the carrying-forward levers from acquiring sufficient momentum to rotate them more than the distance of one tooth. In the present instance I have shown one form of brake mechanism for this purpose; but I do not desire to limit my invention to the particular construction shown. The brake mechanism referred to consists of a series of pins 30, (see Figs. 6, 10, and 18,) one for each lever employed to carry forward. The pins 30 are located in slots 32 in the drum or shell 27 and are normally projected into the path of movement of the carrying-forward pawls *o* by springs 33, which encircle the lower reduced portion 34 of said pins. The pins 31 are provided with lugs or projections 35, which are adapted to engage a cross strip or bar 36, attached to or forming part of the inner circumference of the shell or drum 27 (see Fig. 6) and which cross strip or bar serves as a stop to limit the upward or inward movement of the brake-pins.

Figures 9, 9A:
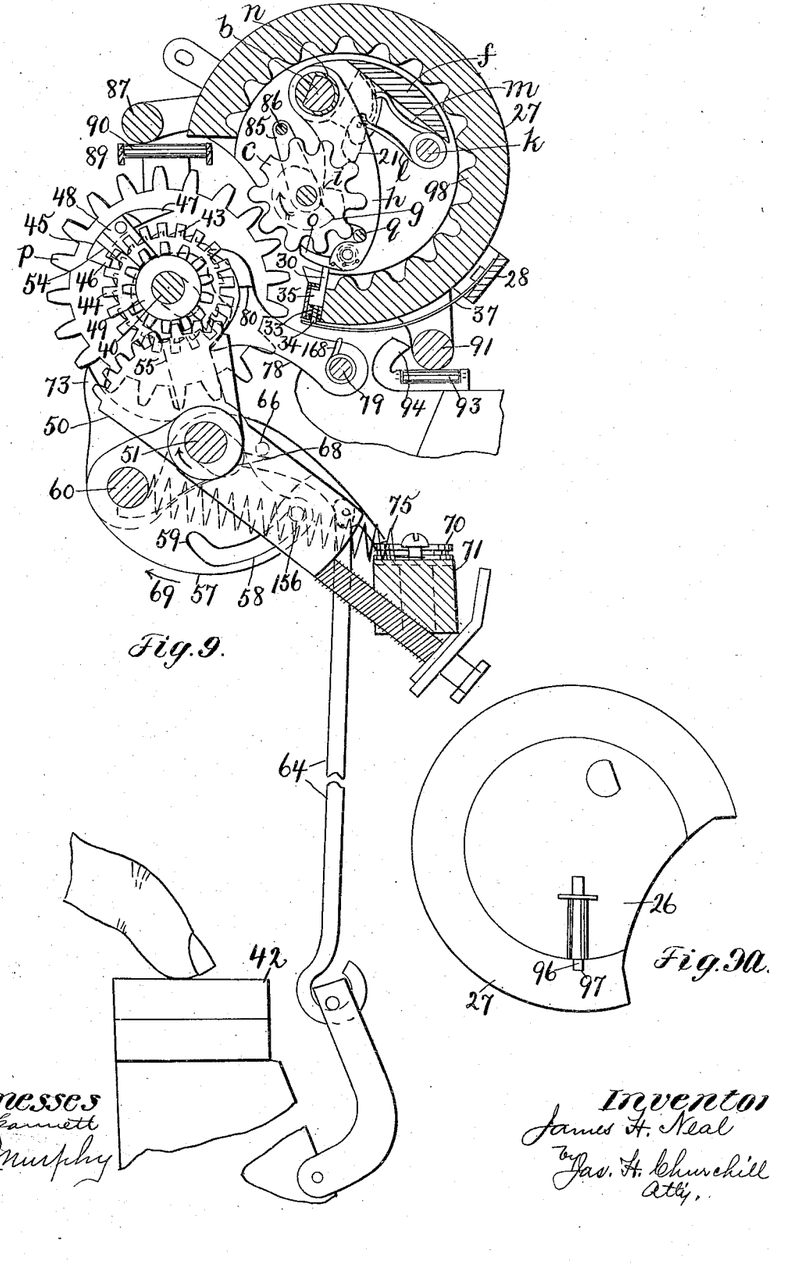
Figures 10, 11, 12, 13, 14, 15, 16, 17, 18, 19:
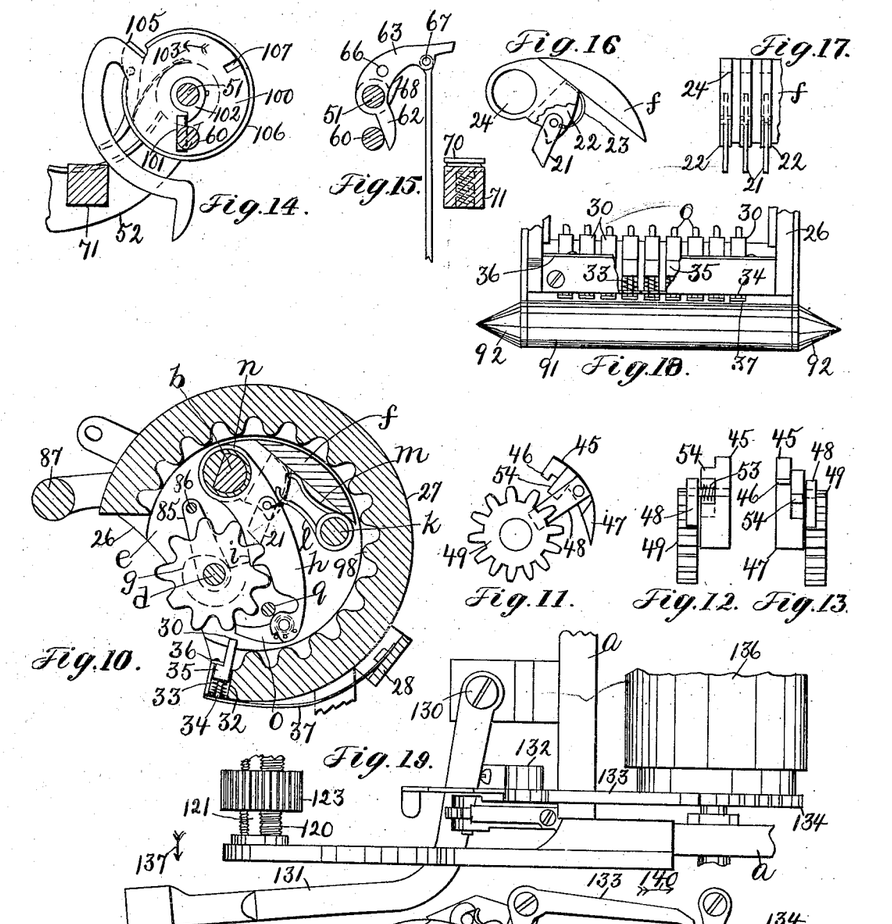

The reduced portion 34 of the pins 30 may, and preferably will, extend beyond the outer circumference of the shell or drum 27 and be engaged by auxiliary springs 37, secured to the cross bar or yoke 28. By reference to Figs. 6 and 9 it will be seen that when the carrying-forward pawls *o* are in the position shown therein they are in engagement with the upper surface of the pins and the latter are moved outward against the action of the springs 33. When the carrying-forward levers are moved backward by the cams on the numeral-wheels, as shown in Fig. 10, the pawls *o* are withdrawn from engagement with the brake-pins 30, and the latter are forced by the springs 33 into the path of movement of the pawls *o*, so that when a carrying-forward lever is moved forward by its spring 1 the push-pawl *o* is engaged with a brake-pin, and the movement of the push-pawl is arrested or retarded to such extent as to prevent the momentum imparted by the said pawl to the numeral-wheel with which it is in engagement moving the said wheel more than the distance of one tooth. This is an important feature practically, as it insures accuracy in the operation of the machine.

Figures 3, 4, 5:
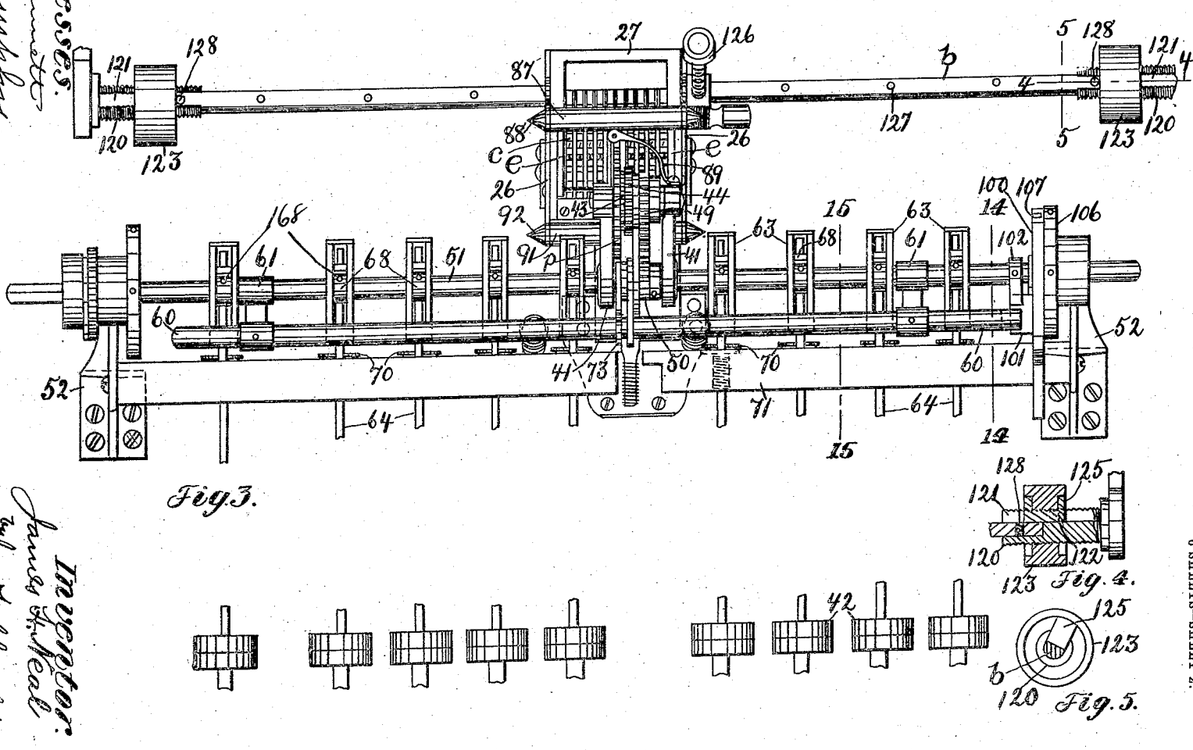

The toothed numeral-wheels *c* are adapted to be brought into engagement with the master-wheel *p*, which is loose on a shaft 40, having bearings in brackets 41, (see Fig. 3,) attached to the framework of the machine at the front of the same. The master-wheel *p* is adapted to be rotated by mechanism, as will be described, which is operatively connected with the numeral-keys 42 of the typewriting machine.

In the present instance the master-wheel *p* has secured to or forming part of it a ratchet-wheel 43 and a square-toothed wheel or gear 44, with which latter coöperates a driving-pawl 45, (see Figs. 6, 9, 11, 12, and 13,) having a square nose or projection 46, which fits closely the space between adjacent teeth of the gear or toothed wheel 44. The driving-pawl 45 is provided with a tailpiece 47 for a purpose as will be described and is pivoted to an arm 48, fast to a pinion 49, loose on the shaft 40, the said pinion being rotated by a toothed segment 50, fast on a shaft 51, having bearings in the brackets 52, attached to the front of the machine.

The driving-pawl 45 is normally kept in engagement with the toothed wheel 44 by a spring 53, (see Fig. 12,) coiled about its pivot in the usual or well-known manner, and the said pawl has secured to its side a lug or projection 54, which is adapted to be engaged by a movable device 55, which may be referred to as a "cam-bar" and which at the proper time, as will be described, is moved up into engagement with the lug or projection 54 when it is desired to disengage the pawl 45 from the square-toothed wheel 44. The cam-bar 55 (see Fig. 7) is provided with suitable elongated slots 56 157, through which the shafts 40 51 are extended and which permit of the bodily movement of the cam-bar. The cam-bar 55 at its lower end is provided with a pin or projection 156, which extends into a slot in a cam-segment 57, loose on the rock-shaft 51. The slot referred to is provided with a circular portion 58, concentric with the rock-shaft 51, and with a cam or eccentric portion 59 for a purpose as will be described. The cam-segment 57 is operated at each depression of the numeral-keys, and this is effected as will now be described. The cam-segment has extended through it a bar 60, which is extended across the machine and is supported by cranks or arms 61, (see Fig. 3,) loosely mounted on the rock-shaft 51. The bar 60 coöperates with the tailpieces or rear arms 62 of levers 63, loose on the rock-shaft 51 and connected by an extensible connection with the key-levers. The extensible connection referred to comprises, as shown, two screw-threaded rods 64, joined by a turnbuckle or nut 65.

In the present instance each key-operated lever 63 has its long arm slotted to practically form two arms, which support the pins 66 67, the pin 67 serving as a pivot for one of the screw-rods 64 and the pin 66 constituting a device which engages a lug or crank-arm 68, fast on the rock-shaft. The downward movement of the key-lever 63 serves to bring the pin 66 into engagement with the crank-arm 68, and on further downward movement of the key-lever the pin 66 carries the crank 68 with it and rocks the shaft 51 in the direction indicated by the arrow 69, Fig. 6. The crank-arms 68 are capable of being set on the shaft 51, so as to be engaged by the pins 66 at different times, according to the number of the key depressed. The crank-arms 68 may be fastened on the shaft 51 in their adjusted position by set-screws or pins 168, (represented in Fig. 3.)

The downward movement of the levers 63 is limited or arrested by suitable stops, which may be made as herein shown and which consist of adjusting-screws 70, carried by a cross-bar 71, attached to the brackets 52.

When the rock-shaft 51 is moved in the direction indicated by the arrow 69, the cam-segment 57 is moved with it, and the cam-slot 59 moves the cam-bar 55 downward until the pin 156 engages the circular slot 58, thus permitting the nose 46 on the driving-pawl to be engaged with the toothed wheel 44. The continued rotation of the rock-shaft moves the toothed sector 50 into mesh with the pinion 49 and rotates the same, thereby moving the pawl-carrying arm 48 in the direction indicated by the arrow 72, Fig. 6, and moving the square-toothed wheel 44 and the master-wheel p in the same direction, and consequently rotating the numeral-wheel in engagement with the master-wheel in the direction indicated by the arrow thereon in Fig. 6.

When the master-wheel p has been rotated the proper or desired distance, it is locked from further rotation by means of a locking device, shown as a horn or projection 73 on the bar 60, which horn or projection in the present instance coöperates with the master-wheel. The rotation of the master-wheel in the direction indicated by the arrow 72 serves to rotate the numeral-wheel in engagement therewith in the direction indicated by the arrow thereon, and thereby moves the said numeral-wheel a distance represented by the number of teeth equal to the number of the numeral-key, which distance is regulated by setting the cranks or arms 68 on the shaft 51 at different distances with relation to the pins 66.

Figure 1:
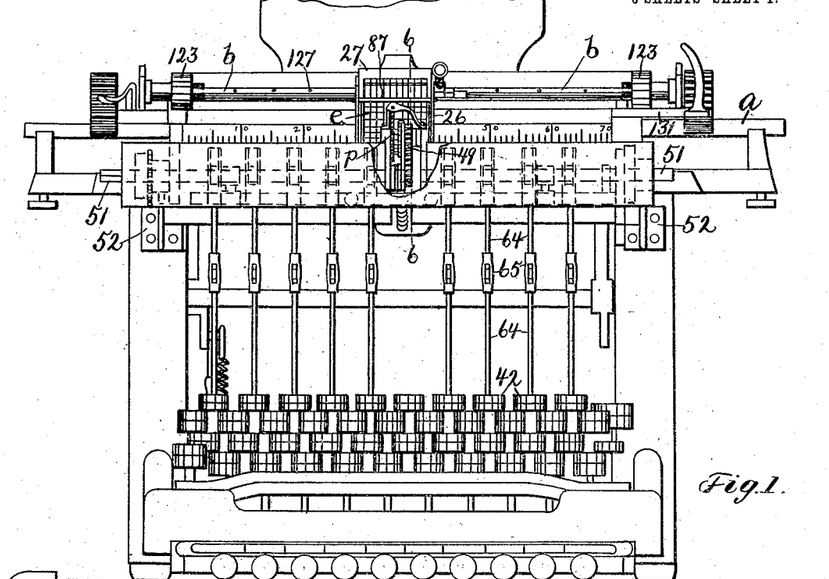
Figure 1 is a front elevation of a type-writing machine provided with a computing attachment embodying this invention.
Figure 2:
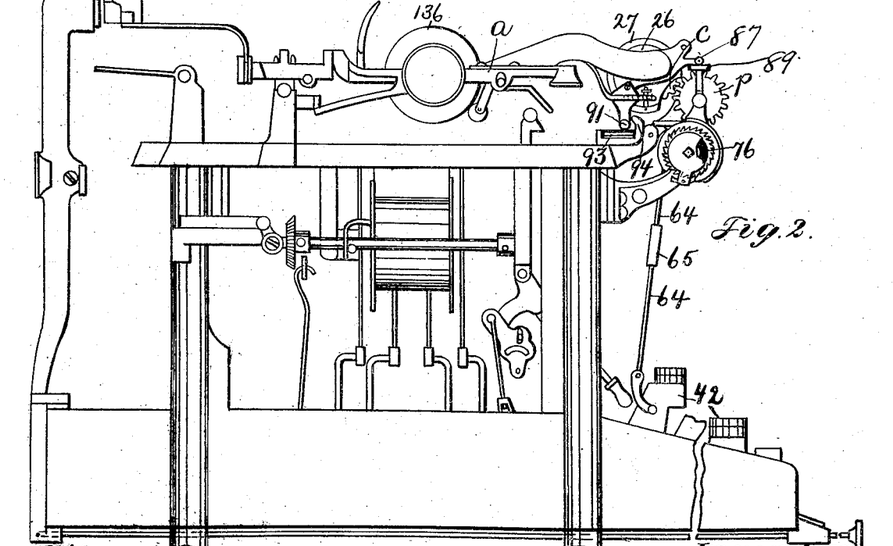
Fig. 2, a side elevation of the machine shown in Fig. 1.

The numeral-wheel c in its rotation causes the cam g thereon to gradually move the carrying-forward lever h backward until the said wheel has made a complete revolution, at which time the high portion of the cam is removed from engagement with the finger i on said carrying-forward lever, and the latter is pushed forward by the spring-arm 1, thereby causing the pawl o to move the next adjacent wheel of the totalizer forward the distance of one tooth. After the key-lever has been depressed and the finger of the operator removed therefrom the lever 63, connected with the said key, is restored to its normal or elevated position by the upward movement of the numeral-key, which is effected in the usual manner. As the lever 63 is elevated the cam-segment 57 is moved in the direction opposite to that indicated by the arrow 69 by springs 75, connected with the bar 60 and with the cross-bar 71, which causes the cam-slot 59 to actuate the pin 156 and elevate the cam-bar 55, bringing the latter into engagement with the lug 54 and moving the nose or projection 46 on the push-pawl out of engagement with the square-toothed wheel 44, thereby permitting the shaft 40 and the pinion 49 thereon to be turned back into their normal position by the movement of the sector 50, when the rock-shaft 51 is moved back into its normal position, which latter is effected in the well-known manner by means of the spring 76 on the end of the rock-shaft. (See Fig. 2.)

The master-wheel p is prevented from being accidentally moved backward by the retaining-pawl 78, which engages the ratchet-wheel 43, the said pawl, as shown, being pivoted on a stud 79 on the frame and normally held in engagement with the said ratchet-wheel by the spring 168.

The backward movement of the push-pawl 45 is arrested by a shoulder or projection 80 on the holding-pawl, which is engaged by the tailpiece 47 of the push-pawl and which shoulder or stop serves to arrest the push-pawl in its backward movement always in the same place, so that the square nose or projection on the pawl will be opposite a space between the square teeth of the wheel 44.

The cam-bar 55 is so shaped that when it is moved downward it engages the tailpiece 47 of the push-pawl 45 and turns the latter on its pivot, so as to positively bring the nose or projection on the push-pawl into the space between the teeth on the toothed wheel 44. The cam-bar 55 is provided with a notch or recess 81 on its rear side, (see Fig. 7,) so that when the push-pawl 45 has been returned to its normal position and the said cam-bar is elevated the lug or projection 54 is brought in line with the recess 81, thereby permitting the nose or projection on the push-pawl to be engaged with the square teeth of the wheel by the cam-bar 55, acting on the tailpiece 47, or by the spring 53 of the pawl.

By providing the push-pawl 45 with the square nose or projection which coöperates with the square teeth of the wheel 44 the master-wheel is under the control of the pawl and is prevented from being moved by momentum, thereby avoiding danger of error from this source. It will thus be seen that in the construction herein shown two independent locking mechanisms are provided for the master-wheel to prevent said wheel being moved by momentum, one of these locking mechanisms comprising the square-nosed pawl and the square-toothed wheel and the other the horn or projection 73 on the bar 60, operated by the numeral-keys, and while I may prefer the construction herein shown I do not desire to limit my invention in this respect.

The totalizer-wheels $c$ are loose on the shaft or rod $d$, and in order to prevent the accumulation of friction due to lateral movement of the totalizer-wheels by the pressure exerted upon the carrying-forward levers by the springs 1, which, if permitted to take place, might give rise to inaccuracies in the apparatus, I have provided means for preventing adjacent totalizer-wheels from making contact with each other. In the present instance this result is accomplished by separating adjacent totalizer-wheels by stationary washers 85, (see Figs. 6, 9, and 10,) which are represented as thin strips, through which are passed the shaft $d$ on which the totalizer-wheels are mounted and a pin or bar 86, extended through suitable holes in the upper end of said strips, which pin or bar is carried by the end disks of the totalizer and holds the washers or strips from turning on the shaft $d$.

An important feature of the present invention consists in making provision for insuring the proper positioning of the totalizer with relation to the master-wheel, so that the teeth of the totalizer will not strike the teeth of the master-wheel and will always pass in proper position with relation thereto. To this end means are provided for effecting a bodily movement of the totalizer and the front end of the carriage, to which it is attached, in two directions substantially at right angles to each other—namely, a substantially vertical direction and a substantially horizontal direction—the extent of which movement is the same or substantially the same in both directions. In the present instance this result is accomplished by securing to the disks 26 of the totalizer, at the front upper end of the same, a cam-rod (shown in the present instance as a cylindrical rod 87, see Fig. 3,) provided at its opposite ends with conical points 88, constituting cams which coöperate with a device for effecting the upward movement of the carriage and totalizer, which device is shown as a bar or arm 89, preferably provided with a roller or antifriction device 90. Below and at the rear of the center of the totalizer is a second cam rod or bar 91, provided with conical ends 92, which coöperate with an antifriction-roller 93, (see Figs. 2, 9, and 10,) carried by the stationary portion of the machine, which cam rod or bar also engages an inclined or cam-shaped lug or projection 94, attached to the framework of the machine. The bodily upward movement of the totalizer is effected by the conical ends of the bars or rods 87 91 engaging the antifriction-rollers, while the backward movement is effected by the bar or rod 91 engaging the cam or lug 94. This feature of my present invention is of importance from a practical standpoint, inasmuch as it enables the totalizer to be applied to the carriages of machines now in operation, and which may be more or less warped or out of true, without danger of the totalizer-wheels interfering with the master-wheel. Provision is also made for locking the shell or drum of the totalizer to the end disks of the same, and to this end one of the end disks is provided with a latch or bolt 96, (see Fig. 9ª,) which is adapted to engage a slot 97 in one end of the shell or drum 27. When it is desired to turn the numeral-wheels back to zero, the latch 96 is withdrawn, and the shell or drum is turned on the reduced portion of the end disks 26, thereby bringing the teeth 98 on the inner circumference of the shell into engagement with all the teeth of the numeral-wheels except one, which latter is made too short to be engaged by the internal teeth 98, but is yet long enough to be engaged by the master-wheel. Provision is also made for rendering the computer inoperative, and for this purpose the rock-shaft 51 has loose on it a disk 100, (see Figs. 3 and 14,) provided with a lug 101, adapted to engage the end of the bar 60 and also a crank or arm 102, fast on the said rock-shaft, so that when the disk 100 is turned in the direction indicated by the arrow 103, Fig. 14, the lug 101 will carry with it the bar 60 and the crank 102, until the rock-shaft 51 has been turned sufficiently to move the cranks 68 out of the range of movement of the pins 66 when the levers 63 are turned by the depression of the numeral-keys. The disk 100 may be locked in the position just described by a pawl 105, pivoted to a stationary part 106 of the frame and entering a notch 107 in the periphery of the disk 100.

The rod $b$, supporting the totalizer, may and preferably will be secured to the carriage $a$ by the means herein shown and as will now be described.

The paper-carriage has secured to it externally-screw-threaded bosses 120, (see Fig. 3,) each provided with a longitudinally-extended slot 121, into which the end of the bar b is extended (see Figs. 4 and 5) and wherein the said bar is locked by a key 122, which fits the slot 121 and is moved longitudinally therein by a nut 123, which engages the screw-threaded boss and screw-threads on the exterior of the key 122. The key 122 is provided at its ends with flanges 125, which engage the sides of the nut. The totalizer may be adjusted longitudinally on the rod b and may be secured in its adjusted position by a thumb-screw 126, having its end adapted to enter one of a series of holes 127 in said bar. The slots 121 in the bosses 120 may be provided with studs or pins 128, which are adapted to enter the end holes 127 in the bar b.

In order to increase the speed of the computing device on type-writing machines having a peripheral feed for the paper-roll, I have provided for turning the roll and setting the carriage to the position desired with one motion, and to this end the carriage a has pivoted to it at 130 (see Figs. 19 and 20) a bent or curved lever 131, which is pivoted to move in a substantially horizontal plane and which engages a lever 132, carrying a push-pawl 123, which engages teeth 134 on the periphery of a disk 135, fastened to the end of the paper-roll 136.

Figure 20:
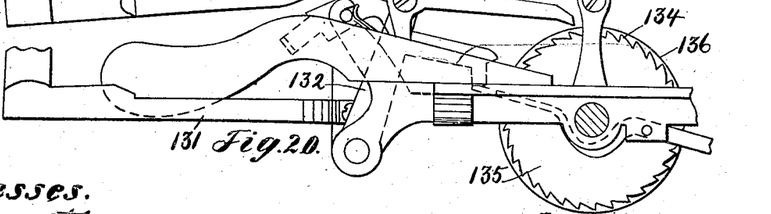

By reference to Figs. 19 and 20 it will be seen that pressure applied to the free end of the lever 131 in the direction indicated by the arrow 137, which is the direction the pressure is applied when the carriage a is moved back toward the right-hand end of the machine, will cause said lever to turn the pawl-carrying lever 132 so as to move the feed-pawl 133 in the direction indicated by the arrow 140, Fig. 20, and thereby rotate the paper-roll 136 to feed the paper on the same. The lever 131 may be returned to its normal position by hand or it may be by a spring in a manner well understood.

I claim—

1. The combination with a type-writing machine provided with numeral-keys and with a movable paper-carriage, of a totalizer attached to and movable with said carriage and provided with a plurality of numeral-wheels, a master-wheel with which said numeral-wheels are adapted to be engaged, a ratchet-wheel and a square-toothed driving-wheel attached to said master-wheel, a push-pawl provided with a nose or projection coöperating with the toothed driving-wheel, a pinion having secured to it an arm to which said pawl is pivoted, a toothed segment coöperating with said pinion, a rock-shaft upon which said toothed segment is mounted, a releasing-bar coöperating with said push-pawl, a cam-segment on said rock-shaft actuating said releasing-bar, a projection movable with said cam-segment to lock said master-wheel, dogs or arms fast on said rock-shaft, levers loose on said rock-shaft and coöperating with said dogs or arms to move said rocking-shaft, tailpieces on said levers, a bar connected with said cam-segment and coöperating with the tailpieces of the said levers, and means connecting said levers with the numeral-keys, substantially as described.

2. The combination with a type-writing machine provided with a movable paper-carriage, of a totalizer supported by and movable with said carriage, and means interposed in the path of movement of the totalizer for engaging the same and effecting bodily movement of said totalizer and carriage in different directions substantially at right angles to each other, substantially as described.

3. The combination with a type-writing machine provided with a movable paper-carriage, of a totalizer supported by and movable with said carriage, cams attached to said totalizer, and devices interposed in the path of movement of said carriage and coöperating with said cams to simultaneously move said totalizer backward and upward, substantially as described.

4. The combination with a type-writing machine provided with numeral-keys, of a totalizer attached thereto and provided with numeral-wheels, a master-wheel coöperating with said numeral-wheels, a toothed wheel movable with said master-wheel, a pawl coöperating with said toothed wheel, a releasing device coöperating with said pawl to disengage it from said toothed wheel, and means operated by said numeral-keys for withdrawing said releasing device from engagement with said pawl to permit the latter to be engaged with the toothed wheel.

5. The combination with a type-writing machine provided with numeral-keys, of a totalizer attached thereto and provided with numeral-wheels, a master wheel coöperating with said numeral-wheels, a rectangular toothed wheel movable with said master-wheel, a driving-pawl provided with a rectangular nose or projection to engage the said toothed wheel, means to disengage said pawl from said toothed wheel, means to move said pawl backward, a ratchet-wheel movable with said toothed wheel, a holding-pawl coöperating with said ratchet-wheel and with said driving-pawl to arrest the backward movement of said pawl and thereby properly position the same with relation to the toothed wheel, substantially as described.

6. The combination with a type-writing machine provided with numeral-keys, of a totalizer provided with a plurality of numeral-wheels, mechanism for connecting said numeral-wheels with said numeral-keys carrying forward levers coöperating with said wheels, pawls carried by said levers and engaging said wheels, and a yielding brake mechanism coöperating with said pawls, substantially as described.

7. The combination with a type-writing machine provided with numeral-keys, of a totalizer provided with end disks, a cross-bar connecting said disks and provided with a plurality of arms projecting from said cross-bar, a plurality of numeral-wheels, mechanism connecting said numeral-wheels with said numeral-keys carrying forward levers coöperating with said wheels and movable between said arms, and holding-pawls pivoted to said arms and engaging said wheels, substantially as described.

8. The combination with a type-writing machine provided with numeral-keys, of a totalizer provided with end disks and with a shell or drum rotatably mounted on said end disks, a plurality of numeral-wheels within said drum, mechanism connecting said numeral-wheels with said numeral-keys and a locking device carried by one of said end disks and coöperating with said drum to lock the same to the end disks, substantially as described.

9. The combination with a type-writing machine, provided with a paper-carriage, of a totalizer attached to the carriage to move therewith, cam-bars attached to said carriage, and means coöperating with said cam-bars to effect bodily movement of the totalizer in two directions substantially at right angles to each other, substantially as described.

10. The combination with a type-writing machine provided with numeral-keys, of a totalizer attached to said machine, a master-wheel for operating said totalizer, a toothed driving-wheel for rotating said master-wheel, a pawl coöperating with said toothed driving-wheel to rotate the same, and means operated by the depression of a numeral-key for disengaging the said pawl from said driving-wheel, substantially as described.

11. The combination with a type-writing machine, of a totalizer attached to said machine, a master-wheel for operating said totalizer, a toothed driving-wheel for rotating said master-wheel, a pawl for rotating said toothed wheel, a rock-shaft, a bar coöperating with said pawl to disengage it from said driving-wheel, and means on said rock-shaft for moving said bar into and out of engagement with said pawl, substantially as described.

12. The combination with a type-writing machine, of a totalizer attached to said machine, a master-wheel for operating said totalizer, a toothed driving-wheel for rotating said master-wheel, a pawl for rotating said toothed wheel, a rock-shaft, a bar coöperating with said pawl to disengage it from said driving-wheel, a cam-segment on said rock-shaft operatively connected with said bar to engage and disengage the latter with and from said pawl, substantially as described.

13. The combination with a type-writing machine, provided with numeral-keys, of a totalizer attached to said machine, a master-wheel for operating said totalizer, a rock-shaft, means for connecting said rock-shaft with said numeral-keys and means actuated by said rock-shaft for locking said master-wheel against movement by momentum, substantially as described.

14. The combination with a type-writing machine provided with numeral-keys, of a totalizer attached to said machine, a master-wheel to operate said totalizer, a rock-shaft operatively connected with said master-wheel, levers loose on said rock-shaft, means for connecting said levers with said numeral-keys, a bar extended substantially parallel with said rock-shaft, and adapted to be engaged by said levers, and means movable with said bar to lock the master-wheel from rotation by momentum, substantially as described.

15. The combination with a type-writing machine provided with numeral-keys, of a totalizer attached to said machine, a master-wheel to operate said totalizer, a rock-shaft operatively connected with said master-wheel, levers loose on said rock-shaft, means for connecting said levers with said numeral-keys, a cross-bar provided with adjustable stops coöperating with the levers loose on the rock-shaft, substantially as described.

16. The combination with a type-writing machine provided with numeral-keys, of a totalizer attached thereto, a master means to operate said totalizer, a rock-shaft, mechanism connecting said rock-shaft with said master means, mechanism connecting said rock-shaft with said numeral-keys, a bar or rod extended substantially parallel with said rock-shaft and movable with said numeral-keys, a device to engage said bar or rod and move it into a position wherein it is not operated by said numeral-keys, and means to lock said bar and device in said position, substantially as described.

17. The combination with a type-writing machine provided with a paper-carriage, of a totalizer, a bar or rod upon which said totalizer is mounted, and means for detachably securing said bar or rod to said paper-carriage, said means comprising threaded bosses attached to the paper-carriage and provided with longitudinally-extended slots for the reception of the totalizer-supporting bar, nuts engaging said threaded bosses, and keys fitted into the slots in said bosses and provided with external screw-threads in engagement with said nuts, whereby rotation of said nuts in one direction moves the said keys into engagement with said totalizer-supporting bar, substantially as described.

18. The combination with a type-writing machine, of a totalizer attached thereto, a master-wheel to operate said totalizer, a toothed driving-wheel movable with said master-wheel, a pawl coöperating with said driving-wheel and provided with a nose or projection adapted to enter the space between the teeth of said driving-pawl, a lug on said pawl, and means to engage said lug and remove the nose or projection on said pawl from between the teeth of the driving-wheel, substantially as described.

19. The combination with a type-writing machine provided with numeral-keys, of a totalizer provided with a plurality of numeral-wheels, carrying forward levers coöperating with said wheels, pawls carried by said levers and engaging said wheels, a yielding brake mechanism coöperating with each of said pawls and mechanism for connecting said numeral-wheels with said numeral-keys.

20. The combination with a type-writing machine provided with numeral-keys, of a totalizer attached thereto, a master-wheel to operate said totalizer, levers connected with said numeral-keys, and provided with tailpieces, a bar coöperating with and movable by said tailpieces, and a locking device for said master-wheel movable with said bar, substantially as described.

In testimony whereof I have signed my name to this specification in the presence of two subscribing witnesses.

JAMES HENRY NEAL.

Witnesses:
JAS. H. CHURCHILL,
J. MURPHY